US006956823B1

(12) United States Patent
Wu et al.

(10) Patent No.: US 6,956,823 B1
(45) Date of Patent: Oct. 18, 2005

(54) APPARATUS AND METHOD FOR CLASSIFYING TERMINATING NUMBERS

(75) Inventors: Ying-Li Wu, Superior, CO (US); Louis Tsai, Thornton, CO (US)

(73) Assignee: Qwest Communications International Inc., Denver, CO (US)

(*) Notice: Subject to any disclaimer, the term of this patent is extended or adjusted under 35 U.S.C. 154(b) by 725 days.

(21) Appl. No.: 09/686,563

(22) Filed: Oct. 11, 2000

(51) Int. Cl.[7] .............................................. H04L 12/26
(52) U.S. Cl. ....................... 370/241; 370/468; 375/222
(58) Field of Search ........................ 379/93.01, 112.06, 379/114.01, 904, 112.01; 370/241, 249, 250, 370/252, 352, 355, 357; 709/223, 224

(56) References Cited

U.S. PATENT DOCUMENTS 5,311,578 A 5/1994 Bremer et al.
5,404,400 A * 4/1995 Hamilton .................... 379/386
5,815,682 A 9/1998 Williams et al.
5,870,458 A 2/1999 Pappas et al.
6,055,245 A 4/2000 Mitchell et al.
6,580,788 B1 * 6/2003 Koehler ................. 379/112.06
6,633,545 B1 * 10/2003 Milbrandt ................... 370/252

* cited by examiner

*Primary Examiner*—Ricky Ngo
*Assistant Examiner*—Derrick W Ferris
(74) *Attorney, Agent, or Firm*—Townsend and Townsend and Crew LLP

(57) ABSTRACT

An identification system includes a modem and a dialog processing device in communication with a telephonic network to identify and classify a multiple of terminating connections. A classification algorithm attempts to establish an analog modem connection using the modem and also monitors operation of the dialog processing device. In response to the modem and the dialog processing device, a controller classifies the terminating connection then writes the type to the database. The classification algorithm will then loop back to the next terminating connection listed in the terminating connection field.

2 Claims, 2 Drawing Sheets

26 (28, 30, 32)

| Terminating Connection | Type Classification | Return To |
|---|---|---|
| 13 — 248-601-0001 | Analog Modem | |
| 248-601-0002 | ISDN Modem | |
| 13' — 248-601-0003 | ? | x |
| 248-601-0004 | Voice | |
| 248-601-0005 | Fax | |
| ...................... | ....... | |
| ...................... | ....... | |
| ...................... | ....... | |
| ...................... | ....... | |

APPARATUS AND METHOD FOR CLASSIFYING TERMINATING NUMBERS

BACKGROUND OF THE INVENTION

The present invention relates to an identification system for each terminating connection on a competitive local exchange carrier, and more particularly to identification system that classifies each terminating telephone numbers associated with a modem to isolate and quantify modem traffic.

A vast number of communication applications today require substantial amounts of data to be downloaded or transmitted through a communication medium having a multiple of terminating connections. In addition to conventional voice transmission, many communication applications include an analog modem that transmits and receives modulated data in analog form over a public switched telephone network (PSTN) or competitive local exchange carrier (CLERC). Further, digital transmission services such as, for example, T1 services, E1 services, and Integrated Services Digital Network (ISDN) to transmit and receive data are increasing in availability.

It is often desirable to remotely determine what type of communication application is associated with each terminating connection or telephone number. Accordingly, it is desirable to provide a system which accesses a multiple of predetermined terminating connections on the communication medium to determine what type of communication application is associated with each of the terminating connection.

SUMMARY OF THE INVENTION

The identification system according to the present invention includes a modem and a dialog processing device in communication with the telephonic network having a plurality of terminating connections. The system further includes a controller having a CPU and a storage device containing a database and a classification algorithm for operation of the system.

In operation, the system identifies and classifies each terminating connection. A plurality of telephone number are input into the system and stored in the database as the terminating connection field. The classification algorithm attempts to establish an analog modem connection using the modem to identify each of the terminating connections in the terminating connection field. Accordingly, if an analog modem is connected to the terminating connection, the modem will communicate with the analog modem at the terminating connection at a negotiated maximum baud rate. The controller running the classification algorithm classifies this terminating connection as either an analog modem or a facsimile machine based upon the negotiated maximum baud rate then writes the type to the database.

The classification algorithm also monitors operation of the dialog processing device. The dialog processing device preferably attempts to identify whether an ISDN modem, voice communication or other communication device is connected to the terminating site. In response to the dialog processing device, the controller classifies the terminating connection then writes the type to the database. The classification algorithm will then loop back to the next terminating connection listed in the terminating connection field.

Moreover, by using the dialog processing device, the classification algorithm will further identify whether the terminating connection is busy or is not answered. If no connection can be established, the controller will identify the terminating connection in a "return to" field of the database at a later time.

The present invention therefore provides a system which accesses a multiple of predetermined terminating connections on the communication medium to determine what type of communication application is associated with each of the terminating connection.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 2:
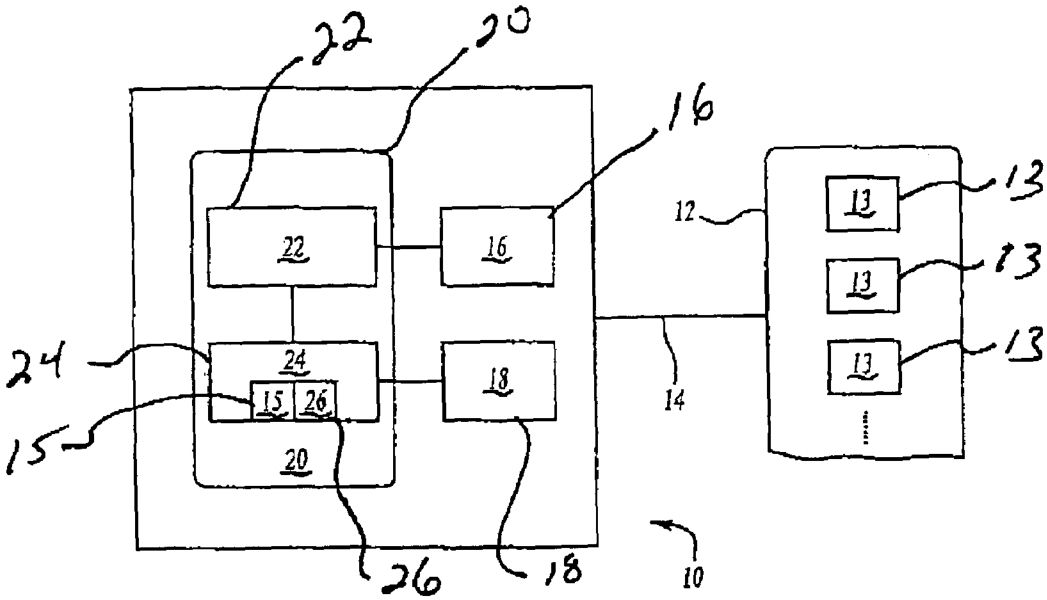
FIG. 1 is a general schematic block diagram of a system according to the present invention.
FIG. 2 is a schematic view of a database for the system of FIG. 1 according to the present invention.

FIG. 1 illustrates an identification system 10. The system 10 is connected to a telephone network 12 via a line 14 such as a telephone line 14. The system 10 generally includes a modem 16 and a dialog processing device 18 in communication with the telephonic network 12 having a plurality of terminating connections 13. Preferably, the modem 16 includes a 56K ITU standard (v.90) modem and the dialog processing device 18 includes a high performance voice processing board such as a *Dialogic Corp*. D/21H running Dialogic DNA v.3.1 for *Windows NT*.

The system 10 further includes a controller 20 connected to the modem 16 and the dialog processing device 18. The controller 20 includes a CPU 22 and storage device 24 connected to the CPU 22. The storage device 24 may include a hard drive, CD ROM, DVD, RAM, ROM or other optically readable storage, magnetic storage or integrated circuit. Software for the CPU 22, including a classification algorithm 15 for operation of the system 10 is preferably stored in the storage device 24. Software for the operation of the database 26, the modem 16 and the dialog processing device 18 may also be stored in storage device 24. Preferably, the software includes Microsoft Windows NT 4.0 with service pack 5, however, other software and hardware may alternatively or additionally operatively interact with the present invention. It should be further understood that FIG. 1 is a schematic block diagram illustrating the basic elements of one embodiment of a system according to the present invention; the figure is not intended to illustrate the only specific architecture which will benefit from the present invention. The storage device 24 preferably includes a database 26 such as a Microsoft Access database having a predetermined terminating connection field 28 a type field 30, and a return to field 32 (illustrated schematically in FIG. 2).

In operation, the system 10 preferably identifies and classifies each terminating connection. Most preferably, the system 10 identifies whether an analog or ISDN modem is on the terminating connection and records this in the database 26.

Figure 3:
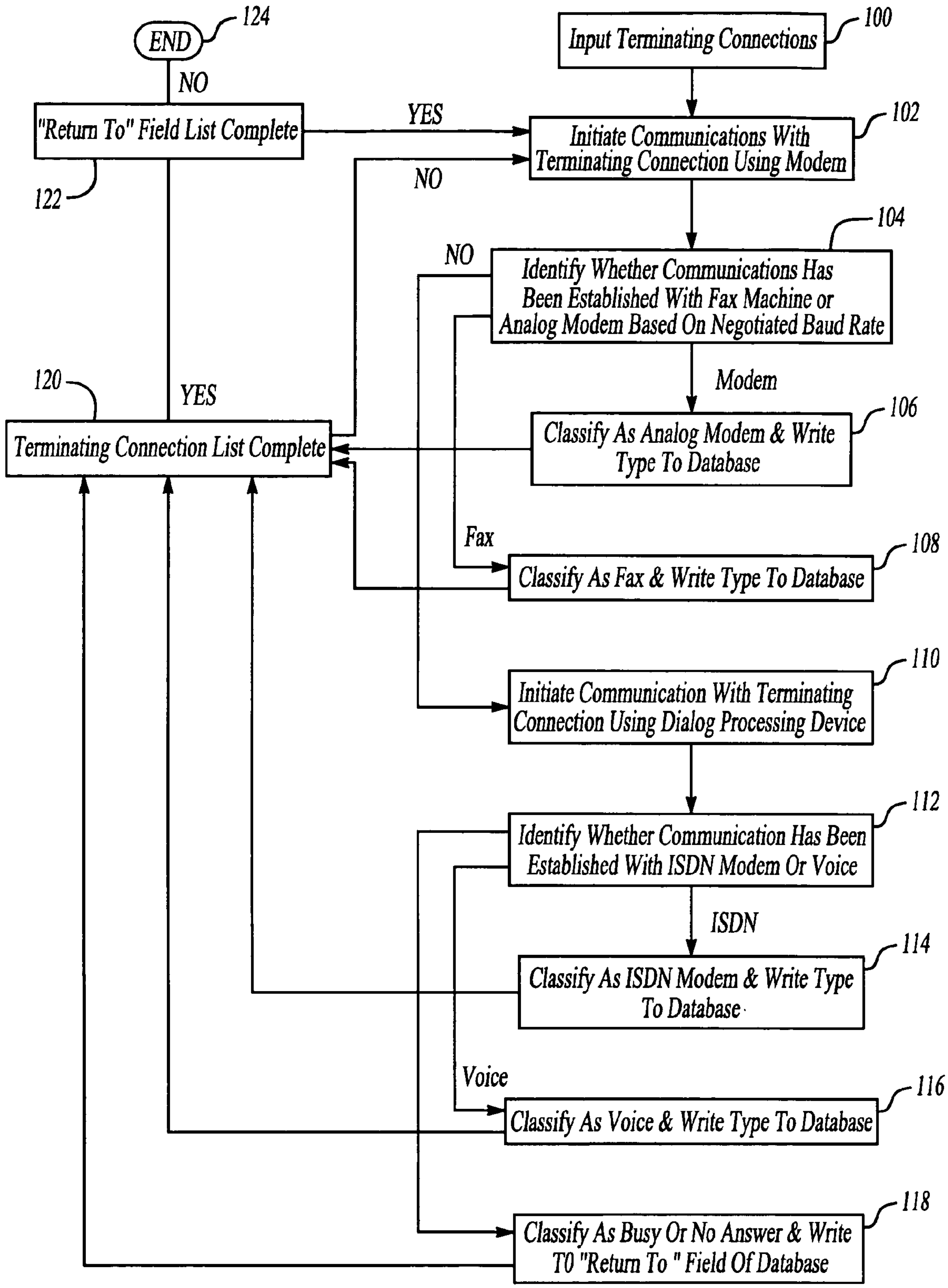
FIG. 3 is a flowchart of a system according to the present invention.

Referring to FIG. 3, the terminating connections 13, such as a plurality of telephone number are input into the system 10 and stored in the database 26 as the terminating connection field 28 in step 100. It should be understood that an entire group of terminating connections 13 may also be automatically generated by the system. For example only, the CPU 22 (FIG. 1) may include software to generate all telephone numbers within a particular geographical area, all telephone numbers for a particular area code, or all telephone numbers having other predefined parameters.

The system 10 will then initiate operation based on the terminating connection field 28. The classification algorithm 15 will proceed to step 102 and attempt to establish an analog modem connection using the modem 16 to identify the first terminating connection 13 (FIG. 2) in the terminating connection field 28. As known, a modem includes an industry standard handshake protocol which can be immediately identified. Accordingly, if an analog modem is connected to the terminating connection 13, the modem 16 will identify the analog modem at the terminating connection in step 104. The controller 20 running the classification algorithm 15 classifies this terminating connection as either an analog modem or a facsimile machine in at step 104.

The controller 20 identifies whether an analog machine is connected to the terminating connection 13 at step 106. An analog modem is classified by the classification algorithm 15 based upon the negotiated maximum baud rate identified in step 104. A negotiated maximum baud rate is typically greater than 1000 bits/sec for an analog modem. Once the classification algorithm 15 classifies the terminating connection 13 as an analog modem, the system records this in the type field 30 (FIG. 2). The system 10 will then loop back to step 102 to attempt to establish an analog modem connection using the modem 16 with the next terminating connection listed in the terminating connection field 28 (FIG. 2).

The controller 20 identifies whether a facsimile machine is connected to the terminating connection 13 at step 108. A facsimile machine is preferably classified by the classification algorithm 15 based upon the negotiated maximum baud rate identified in step 104. The maximum baud rate is typically less than 1000 bits/sec for a facsimile machine. Thus if the negotiated maximum baud rate identified in step 104 is less than 1000 bits/sec, the controller 20 will classify the terminating connection as a facsimile machine record this in the type field 30 at step 108 then loop back to step 102.

The classification algorithm 15 will also monitor operation of the dialog processing device 18 (FIG. 1) at step 110. It should be understood that the step sequencing is for illustrative purposes only, and the dialog processing device 18 is preferably actively monitoring the terminating connection 13 during operation of the modem 16. The dialog processing device 18 preferably first attempts to identify whether an ISDN modem or voice communication is connected to the terminating site 13 at step 112.

As known, an ISDN modem includes an industry standard handshake protocol (1000 HZ, 2000 HZ, 3000 HZ tri-tone) which is identifiable by the dialog processing device 18. Accordingly, if an ISDN modem is connected to the terminating connection 13, the dialog processing device 18 identifies that the terminating connection 13 is an ISDN modem at step 112. The classification algorithm 15 will then classify this terminating connection as an ISDN modem and record this in the type field 30 at step 114. The classification algorithm 15 will then loop back to step 102 to attempt to establish an analog modem connection using the modem 16 with the next terminating connection listed in the terminating connection field 28.

If neither an analog modem or an ISDN modem is identified at the terminating connection, the classification algorithm 15 also monitors the dialog processing device 18 for other connection types within the capabilities of the dialog processing device 18 at step 112. Another connection type is that of voice which can include a human or answering machine at the terminating connection 13. After the classification is made at step 116, the controller 20 will record the other connection type (in this case a voice answer) at step 116 then loop back to step 102 to attempt to establish an analog modem connection using the modem 16 with the next terminating connection listed in the terminating connection field 28 (FIG. 2).

Moreover, using the dialog processing device 18, the classification algorithm 15 will further identify whether the terminating connection is busy or is not answered at step 112. If no connection can be established, the controller 20 will identify the terminating connection 13' in the return to field 32 of the database 26 (FIG. 2) at step 118. The classification algorithm 15 will then loop back to step 102 to attempt to establish an analog modem connection using the modem 16 with the next terminating connection listed in the terminating connection field 28.

Upon determination that the system 10 has completed the terminating connection field 28 at step 120, the controller 20 will again attempt to establish a connection with the terminating connection 13' in the "return to" field (FIG. 2). This is preferably performed at a later time such as after completion of one complete pass (step 120) through the predetermined terminating connection field 28. The system 10 is preferably programmed to complete one pass through the "return to" field (FIG. 2) then end at step 124.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An identification system comprising:

a modem communicating with a telephonic network;

a dialog processing device communicating with said telephonic network;

a controller communicating with said modern and said dialog processing device to identify a terminating connection at a subscriber's premises of said telephonic network; and software that programs the system to:

receive a plurality of telephone numbers relating to terminating connections, use the modern to attempt to establish an analog modem connection to a terminating connection;

classify the terminating connection as an analog modem if the modem successfully establishes a connection to the terminating connection at a negotiated maximum baud rate greater than about 1000 bits/sec;

classify the terminating connection as a facsimile machine if the modem successfully establishes a connection to the terminating connection at a negotiated maximum baud rate less than about 1000 bits/sec;

use the dialog processing device to monitor the terminating connection during operation of the modem;

classify the terminating connection as an ISDN modem if the dialog processing device detects an ISDN modem at the terminating connection;

classify the terminating connection as a voice connection if the dialog processing device detects a voice connection; and record an entry relating to the classification in a database, wherein the entry includes the classification for the terminating connection as either an analog modem, a facsimile machine, an ISDN modem, or a voice connection.

2. A method of classifying a terminating connection at a subscriber's premises, the method comprising the steps of:

receiving a plurality of telephone numbers relating to terminating connections;

attempting to establish an analog modem connection to the terminating connection using a modem;

classifying the terminating connection as an analog modem if the modem successfully establishes a connection to the terminating connection at a negotiated maximum baud rate greater than about 1000 bits/sec;

classifying the terminating connection as a facsimile machine if the modem successfully establishes a connection to the terminating connection at a negotiated maximum baud rate less than about 1000 bits/sec;

monitoring the terminating connection during operation of the modem using a dialog processing device;

classifying the terminating connection as an ISDN modem if the dialog processing device detects an ISDN modem at the terminating connection;

classifying the terminating connection as a voice connection if the dialog processing device detects a voice connection; and recording an entry relating to the classification in a database, wherein the entry includes the classification for the terminating connection as either an analog modem, a facsimile machine, an ISDN modem, or a voice connection.

* * * * *